United States Patent [19]
Wiersma et al.

[11] Patent Number: 5,856,285
[45] Date of Patent: Jan. 5, 1999

[54] POLYURETHANE ADHESIVE/SEALANT REMOVER

[75] Inventors: Jack G. Wiersma, Palm Beach Gardens; Theodore G. Christian, Lantana, both of Fla.

[73] Assignee: Nouveau Technologies, Inc., Tequesta, Fla.

[21] Appl. No.: 962,018

[22] Filed: Oct. 31, 1997

[51] Int. Cl.[6] .................................................. C11D 3/43
[52] U.S. Cl. ........................... 510/213; 510/413; 510/461
[58] Field of Search ................................. 510/213, 413, 510/461

[56] References Cited

U.S. PATENT DOCUMENTS

| | | | |
|---|---|---|---|
| 5,071,479 | 12/1991 | Gruening | 106/18.32 |
| 5,098,983 | 3/1992 | Mosbach et al. | 528/59 |
| 5,142,014 | 8/1992 | Markusch et al. | 528/45 |
| 5,202,377 | 4/1993 | Thorne et al. | 524/591 |
| 5,248,450 | 9/1993 | Metzner et al. | 252/380 |
| 5,612,408 | 3/1997 | Koenig et al. | 524/591 |

*Primary Examiner*—Paul Lieberman
*Assistant Examiner*—John R. Hardee
*Attorney, Agent, or Firm*—McHale & Slavin P.A.

[57] ABSTRACT

A composition for use in removing polyurethane adhesive/sealant. The composition consists of an effective amount of PMA Glycol Ether Acetate, Dipentene, and Nonylphenol Polyethylene Glycol Ether. Upon application of the composition to a polyurethane adhesive/sealant, the adhesive bond of the polyurethane is destroyed allowing for ease of removal without affecting materials previously bonded.

4 Claims, No Drawings

POLYURETHANE ADHESIVE/SEALANT REMOVER

FIELD OF THE INVENTION

This invention is directed to the field of adhesives, and in particular to a composition for removal of cured polyurethane adhesive/sealants.

BACKGROUND OF THE INVENTION

The ability to join two items together, without the need of a mechanical fastener, can be performed by use of an adhesive. The types of applications for adhesives are too numerous to list. In the marine industry, a product that provides a combination adhesive and sealant has been found to be particularly useful. Boat manufacturers and operators avoid using metal fasteners unless absolutely necessary due to the problem with electrolysis, which can be especially progressive in salt water. For this reason, the use of an extremely high tack polyurethane adhesive/sealant has become universally recommended for bonding and sealing of underwater thru-hull fittings, bonding of wood to fiberglass, rubrails to fiberglass, windows to fiberglass, fiberglass to fiberglass, hull-to-deck joints, electrical insulation, and so forth.

For instance, polyurethane adhesive/sealants can be used to accompany thru-hulls for raw water engine intake, air conditioner intakes, macerator in-take and out-take fittings, transducers and so on wherein placement of the material around the fitting during installation creates not only an impermeable seal, but the adhesive prevents the fitting from coming loose.

Polyurethane adhesive/sealant has incredible adhesion abilities, yet it maintains the ability to remain flexible after it cures. Unique to the polyurethane material is its ability to remain workable for up to four hours, wherein it becomes tack-free in 48 hours and completely cures within seven days. Polyurethane adhesives/sealant further remains flexible after it cures. This allows the fitting to move if need be without cracking of the fiberglass or gelcoat. One such manufacturer of adhesive, the 3M Corporation, markets the most popular brand known as 5200 adhesive/sealant.

A problem with superior holding ability of the polyurethane adhesive occurs if the material needs to be removed. For example, metal fittings that are used on a boat, especially fittings placed below the water line, are subject to electrolysis or simply wear out. In any event, eventually such thru-hulls must be replaced or a structural integrity problem arises. For this reason, thru-hulls must be replaced routinely and the superior adhesion of the polyurethane adhesive/sealant dealt with. When the polyurethane adhesive is uncured, it can be removed with a solvent such as kerosene. Once cured, no known substance is marketed for removal of the polyurethane that can be used safely by the general consumer. Without chemical softening, the adhesive must be broken out of the seal by use of a screwdriver, sharp knife, grinder, or the like tool. If not performed expertly, the gelcoat and underlying fiberglass may be marred leading to additional problems. In those instances, removal of the fitting joined by use of the polyurethane adhesive/sealant can result in a tremendous amount of damage to a vessel wherein any attempt to place a new thru-hull into the damaged area will provide a latent failure condition which could lead to sinking of the vessel.

In many instances the item that is bonded remains in good condition and need only be moved. For example, table tops in boats are typically joined by use of polyurethane adhesive. If incorrectly joined, one item may be destroyed in an attempt to separate the items. Even if separated, the remaining adhesive may be difficult to remove requiring scraping or grinding to remove the old adhesive before the new adhesive is employed.

Thus, what is lacking is a convenient means of destroying the adhesive bond on cured polyurethane adhesive/sealant without affecting the items to which the adhesive is secured to.

SUMMARY OF THE INVENTION

The instant invention is composition for use in removal of polyurethane adhesive. The composition is capable of destroying the adhesive bond of a polyurethane adhesive/sealant such as that adhesive bond produced in the well known 3M 5200. The composition consists of PMA glycol ether acetate (1methoxy-2-acetoxypropane, 2-methoxy-1-acetoxypropane); Dipentene; and a nonylphenol polyethylene glycol ether. The composition is maintained as a liquid and liberally applied to a cured polyurethane adhesive. The acetate ether composition is capable of entering the structure of the adhesive wherein the composition propagates freely throughout the adhesive where it attacks the adhesive bond causing its immediate degradation. As the bond is destroyed, the adhesive/sealant can be easily removed from the item bonded too.

For example, if two items are bonded together incorrectly by use of the 3M 5200 polyurethane adhesive/sealant, the adhesive bond can be destroyed upon the liberal application of the acetate ether composition. The composition is preferably applied in a liquid form, spray or brush, or as a paste wherein the composition is admixed with an inert material. After a contact time of approximately fifteen minutes, the composition will enter the adhesive causing immediate destruction. The longer the application contact period, the more complete the adhesive destruction which directly affects ease of removal. The acetate propagates quickly throughout the adhesive.

Thus it is an objective of the instant invention to disclose a polyurethane adhesive/sealant removal composition capable of destroying the adhesive bond in such a well known adhesive such as 3M 5200.

Still another objective of the instant invention is to disclose a polyurethane adhesive/sealant removal composition that does not affect the items bonded such as gelcoat or the like.

Yet still another objective of the instant invention is to disclose a polyurethane adhesive/sealant removal composition that is safe for use by the average consumer, does not require special storage or application procedures.

Still another objective of the instant invention is to disclose a polyurethane adhesive/sealant removal composition capable of effectively destroying the adhesive bond in most bonding applications in less than fifteen minutes.

Other objectives and advantages of this invention will become apparent from the following description taken wherein are set forth, by way of example, certain embodiments of this invention.

DETAILED DESCRIPTION OF PREFERRED EMBODIMENT

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

The instant invention is a composition for use in removing polyurethane adhesive/sealant such as that manufactured by 3M Corporation and sold under the trademark 5200. The adhesive/sealant cures to a tough, flexible, rubbery consistency. The polyurethane adhesive/sealant is the most recommended material for permanent bonding of materials because of its enormous adhesive strength. The sealant remains permanently flexible which allows some movement without cracking or losing adhesion.

The composition of the instant invention has the primary constituents of 1-methoxy-2-acetoxypropane, 2-methoxy-1acetoxypropane; Dipentene; and nonylphenol polyethylene glycol ether. The 1-methoxy-2-acetoxypropane forms approximately 98% of the acetate and 2-methoxy-1-acetoxypropane forming the remaining 2% of the acetate, commercially known as PMA glycol ether acetate. PMA glycol ether acetate is sold under the trademark DOWANOL as manufactured by the Dow Chemical Company. The PMA glycol ether acetate is admixed with Dipentene and a nonylphenol polyethylene glycol. The nonylphenol polyethylene glycol being nonionic surfactant and sold under the trademark TERGITOL NP-9 as manufactured by the Union Carbide Chemical and Plastics Company. The glycol ether acetate $C_{10}$-$H_{12}$-$O_3$ forms 89% of the weight of the composition; Dipentene $C_{10}$-$H_{16}$ approximately 8% by weight; and nonylphenol-polyethylene glycol ether $C_{33}$-$H_{60}$-$O_{16}$ the remaining 2% of the composition. The composition can be stored over a period of time if evaporation is prevented. As with any ether acetate, exposure to vapors is not deemed hazardous although may cause slight eye irritation if used in a closed area. The composition is applied to fully cured polyurethane adhesive wherein the composition is capable of entering the adhesive causing the degradation of adhesive bond wherein the 5200 can be easily removed. When the adhesive bond is broken, the sealant maintains some resiliency allowing the material to be peeled off. If the composition has a prolonged contact, the adhesive and sealant begins to dissolve. It should be noted that the composition of the instant invention also operates on other types of adhesive/sealants such as polysulfides and silicone bases adhesive/sealants. Polyurethane adhesive/sealant is the primary embodiment as it is recognized as one of the most commonly used materials for permanent bonding because of its adhesive strength; 5200 being the most popular and well established brands.

The mixtures stated above are approximate although the preferred mixture ratio at the time of patent submittal. It is to be understood that while we have described certain forms of our invention, it is not to be limited to a specific form or arrangement herein described. It will be apparent to those skilled in the art that various changes may be made without departing from the scope of the invention and the invention is not to be considered limited to what is described in the specification.

What is claimed is:

1. A composition for use in the removal of polyurethane adhesive/sealant comprising: about 89 parts by weight of 1-methoxy-2-acetoxypropane and 2-methoxy-1-acetoxypropane admixed with about 8 parts by weight of dipentene and about 3 parts by weight of a nonylphenol polyethylene glycol ether, wherein said composition will destroy the adhesive bond when applied to a polyurethane adhesive/sealant.

2. The composition according to claim 1 wherein said 1-methoxy-2-acetoxypropane and 2-methoxy-1-acetoxypropane comprises approximately 89% by weight of said composition.

3. The composition according to claim 1 wherein said dipentene approximates 8% per weight of said composition.

4. The composition according to claim 1 wherein said nonylphenol polyethylene glycol ether approximates 3% of the weight of said composition.

* * * * *